United States Patent [19]

Evans

[11] 4,399,970
[45] Aug. 23, 1983

[54] WING LEADING EDGE SLAT

[75] Inventor: Arthur Evans, Seattle, Wash.

[73] Assignee: The Boeing Company, Seattle, Wash.

[21] Appl. No.: 206,590

[22] Filed: Nov. 13, 1980

[51] Int. Cl.³ .............................................. B64C 9/24
[52] U.S. Cl. ................................ 244/214; 244/75 R; 244/216
[58] Field of Search ............... 244/210, 213, 214, 216, 244/218, 215, 75 R

[56] References Cited

U.S. PATENT DOCUMENTS

| | | | |
|---|---|---|---|
| 2,620,147 | 12/1952 | Butler et al. | 244/216 |
| 2,702,676 | 2/1955 | Delaney, Jr. | 244/210 |
| 2,908,454 | 10/1959 | De Wolff | 244/216 |
| 3,831,886 | 8/1974 | Burdges et al. | 244/214 |
| 3,940,093 | 2/1976 | Cabriere | 244/214 |
| 4,285,482 | 8/1981 | Lewis | 244/210 |

FOREIGN PATENT DOCUMENTS

| | | | |
|---|---|---|---|
| 727799 | 11/1942 | Fed. Rep. of Germany | 244/214 |
| 1275058 | 9/1961 | France | 244/216 |

*Primary Examiner*—Galen L. Barefoot
*Attorney, Agent, or Firm*—H. Gus Hartmann; Bernard A. Donahue

[57] ABSTRACT

A wing leading edge slat actuation and positioning system, wherein a slat panel is connected to one end of an extensible track member which is supported and guided at its other end, by rollers mounted to fixed structure in the leading edge section of the wing. The actuation and positioning system comprises a unified drive and a programming mechanism which is connected to the slat panel and functions to combine an aerodynamic slot opening or closure operation with a slat extension drive mechanism. The unified drive and programming mechanism comprises a contoured camtrack somewhat in the shape of an S-camtrack and having a roller follower which is connected to a link and drive arm; and this combination allows synchronization of slat actuation with programming control of slat angle-of-deflection and aerodynamic slot opening or closure.

10 Claims, 7 Drawing Figures

WING LEADING EDGE SLAT

SUMMARY OF THE INVENTION

The present invention relates to a slat panel extension or retraction mechanism and more particularly, to a simple drive linkage mechanism which is functionally combined with a slat position programming arrangement; and wherein this combination lends itself to being compacted into the leading edge portion of a wing having a relatively thin airfoil cross section.

In generally known slat extension systems, a ball-screw jack or a linear hydraulic actuator is utilized; wherein, one end is pivotally connected to a slat panel and the other end pivotally connected to a front wing spar structure. However, the airfoil thickness generally limits the installation area so that there is a relatively restrictive slat travel or extension distance.

Because of limited stowage volume in a relatively thin airfoil cross section, for operating a linkage mechanism, there is great difficulty in designing a simple linkage mechanism that can produce the large amount of slat panel extension travel required. It is necessary to make certain that the linkage mechanism does not get into a kinematic arrangement where it becomes locked up in a stowed position and prevents the slat panel from extending. In one instance, there was success in designing a linkage mechanism that would stow in the limited volume available; but, it would not function as a simple linkage mechanism because of the required folded flatness of the linkage. For stowage of the linkage mechanism, the limited cross-sectional thickness of the airfoil section required that the linkage mechanism fold up into a relatively compact flat arrangement; and due to this flatness requirement, there were certain positions of the linkage, where a rotary actuator could not be made to drive the linkage throughout the complete extension and retraction cycle without locking up. This problem has been solved by the present invention in designing an S-camtrack and roller follower mechanism which produces a vector force component along the arcuate camtrack; and thereby, controls the movement of a pivotal connection, of the simple linkage mechanism, which enables it to operate freely throughout the complete cycle.

DETAILED DESCRIPTION OF THE DRAWINGS

Figure 1:
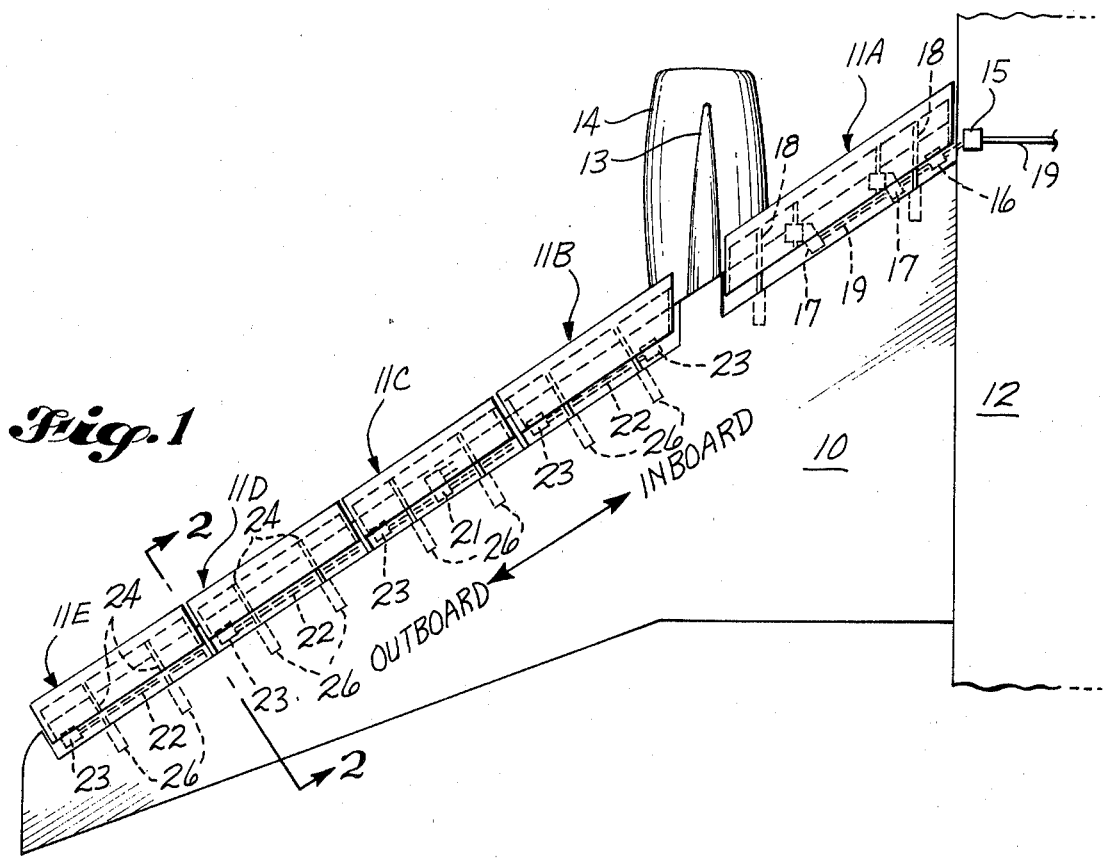
FIG. 1 is a plan view of an airplane swept-back semi-span wing having a spanwise series of slat panels or segments at an extended position normal to the leading edge thereof.

FIG. 1 is a plan view of an airplane semi-span wing 10 having a spanwise series of slat panels, 11A inboard to 11E outboard, depicted at an extended position normal to the leading edge of the wing. The slat extension and retraction system for each semi-span wing, comprises: two separate power drive systems, i.e., an inboard slat drive system for slat panel 11A which is situated between the side of the fuselage 12 and the pylon 13 that supports the engine nacelle 14; and an outboard slat drive system for slat panels 11B to 11E which extend outboard from the engine support pylon 12 toward the wing tip.

The inboard drive system for slat panel 11A, comprises: an angle gear box 15, an inboard power drive unit 16, a pair of combined angle gear box and rotary actuator designated as 17, a pair of carrier tracks 18, and interconnecting torque or drive shafts 19. The inboard slats, in generally known wing leading edge slat systems, are a relatively simple problem compared to the outboard slats, because the inboard slats are generally a two position operation, i.e. either retracted or extended, whereas the outboard slats are generally a three position operation with an aerodynamic slot or unslotted slat condition in the extended position. Also, in generally known slat extension systems, each slat panel has the following units spaced apart along the length of the slat panel: two carrier rails; two linear actuators such as driving ball-screw jacks; and two slat position programming tracks. However, for only the two position inboard slat, it is sometimes possible to do without the programming tracks and get away with doing it entirely by the extension mechanism. Further, there is much greater space available for housing a slat extension mechanism at the inboard location.

The outboard drive system for slat panels 11B to 11E, comprises: a power drive unit 21 such as a hydraulic or electric drive motor; a series of axially aligned torque tube drive shafts 22 which are rotatably driven at a relatively high speed by the power drive unit 21; a speed reducer and torque converter gear box unit, hereinafter referred to as rotary actuator or actuator 23; and slat carrier tracks 24. The high speed shafts 22 operate the extension or retraction movement of the slat panels 11B to 11E, through the actuator 23 which incorporates an epicyclic gear train that functions to reduce the high speed shaft revolution input, in order to operate the extension or retraction drive mechanism of the salt panels at a substantially reduced speed with an increased torque output. The actuator 23 is located near two spanwise adjacent slat panels and provides a direct interconnection therebetween to controllably tie one slat panel to its adjacent slat panel, without an additional slat drive synchronization being required. Also, this arrangement results in a minimum of actuators.

Each individual outboard slat panel 11B to 11E, is structurally supported in the extended position by a pair of curved carrier tracks 24 which protrude aft through a small opening in the front wing spar 25; and this protrusion of the carrier tracks 24, has a fluid tight enclosure 26 because the interior of the wing is usually a fuel bay area.

Figure 2:
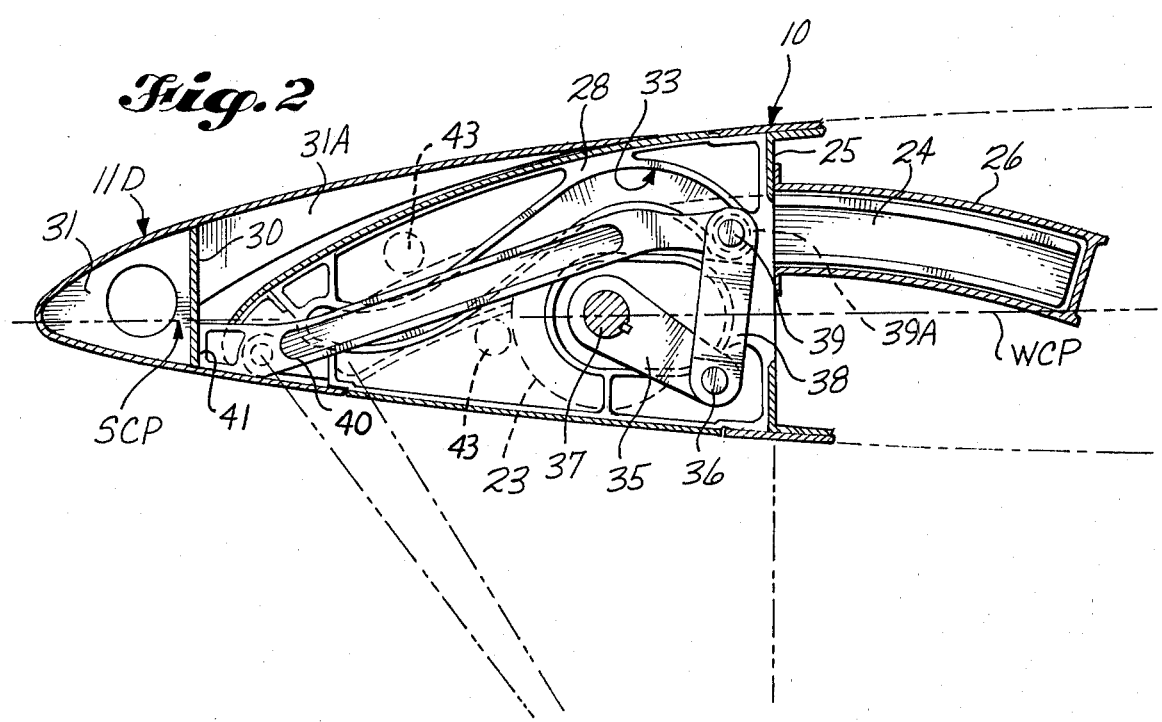
FIG. 2 is a cross-sectional view taken in the direction indicated by the line 2—2 of FIG. 1 which is normal to the leading edge of the wing and shows a slat panel or segment in the retracted or stowed position, whereat it completes the leading edge profile of the wing airfoil section envelope.
Figure 3:
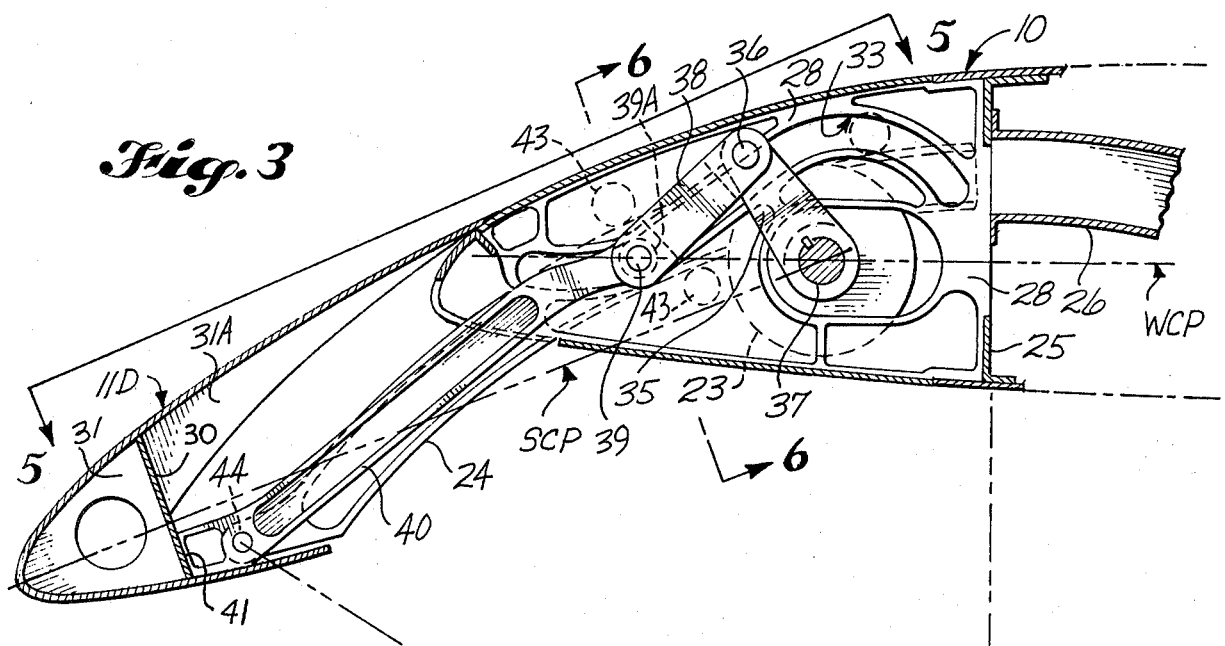
FIG. 3 is a view similar to FIG. 2 with the slat panel extended to a first operative position, whereat the upper surface of the slat and the upper surface of the fixed wing section, form a substantially smooth and continuous upper surface contour without any surface discontinuity; and this position of the slat is generally used for take-off mode of airplane operation.
Figure 4:
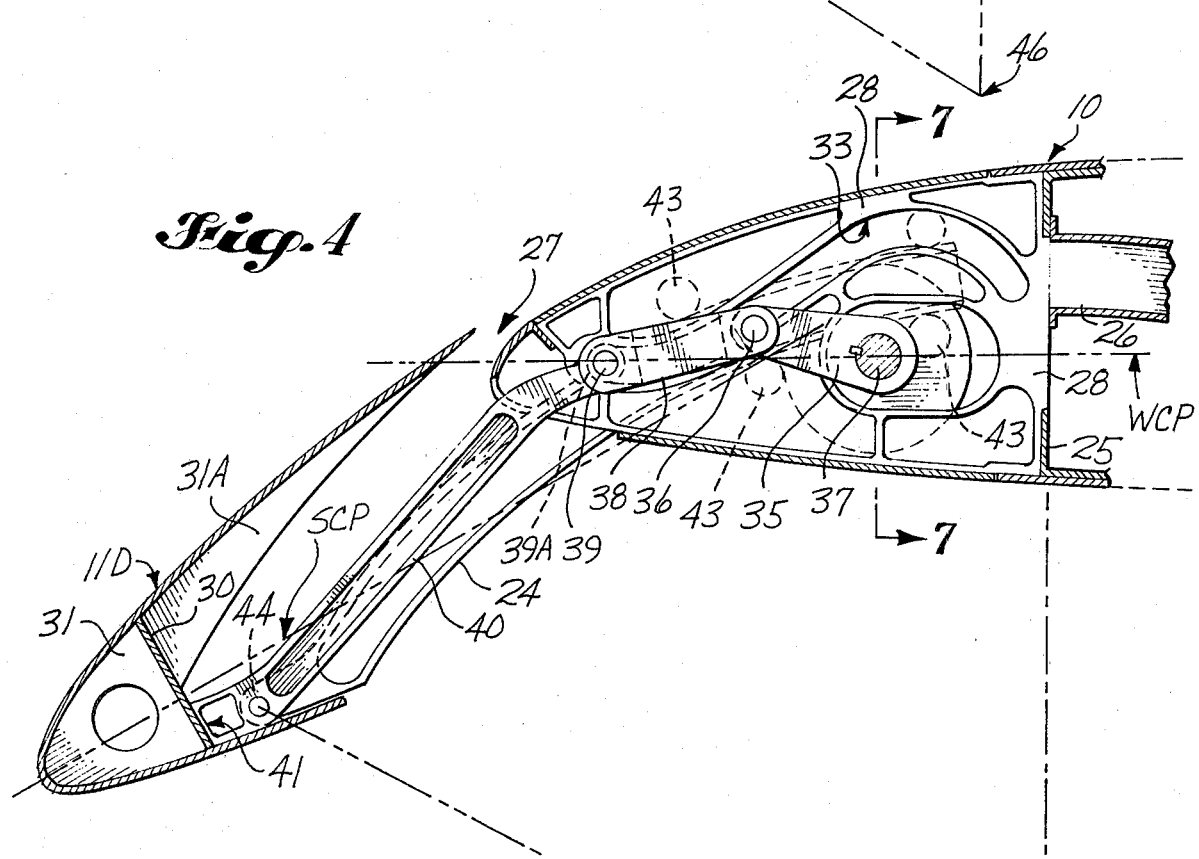
FIG. 4 is a view, similar to the preceding views of FIGS. 2 and 3, showing the slat panel at a further extended position; whereat, an aerodynamic slot is formed between the leading edge of the fixed wing portion and the trailing edge of the extended slat panel; and this position is generally used for the landing mode of airplane operation.

FIGS. 2 to 4 are cross-sectional views taken in the direction indicated by the line 2—2 of FIG. 1 which is normal to the leading edge of the wing and depicts a typical three position leading edge slat panel, such as 11D of FIG. 1 and its linkage mechanism is arranged at different stages of slat operation, i.e.: a retracted stage, as shown in FIG. 2, whereat the typical slat panel 11D completes the nose envelope profile of the wing airfoil section for high-speed cruise flight operation of an aircraft; a first extended stage, as shown in FIG. 3, whereat the trailing edge of the extended slat panel 11D is in an air sealed abutment relationship with the fixed nose section of the wing airfoil and forms therewith a substantially smooth and continuous upper surface contour without any surface discontinuity, and this slat position is generally used for the take-off mode of flight operation; and a second further extended stage, as shown in FIG. 4, whereat an aerodynamic slot is formed between the trailing edge of the extended slat panel 11D and the fixed section of the wing, and this slat position is generally used for the landing mode of flight operation.

Referring to FIG. 2, the wing airfoil section envelope comprises a leading edge nose structure which forms a slat panel 11D that is extensible, from the relatively fixed portion of the wing, in a direction normal to the wing leading edge. This fixed portion of the wing is a rigid leading edge structure which comprises a wing rib 28 that is secured to a spanwise structural member such as a front wing spar 25. The slat panel structure 11D comprises a spanwise nose 30 with slat rib elements 31 and 31A.

Referring to FIG. 3, the integrated drive and programming unit for the slat panel 11D, comprises a contoured camtrack shaped as an S-camtrack 33 and a simple linkage mechanism having a drive arm 35, a drive link 38, and a drive beam 40. The drive arm 35 is splined to a torque shaft 37 of actuator 23 which is supportably mounted to the front wing spar 25. The swinging end of drive arm 35 is pivotally connected at 36 to one end of drive link 38 and the other end of drive link 38 is pivotally connected at 39 to the aft portion of drive beam 40; and the forward portion of drive beam 40 is fixedly secured at 41 to the slat spar 30.

Further, each individual slat panel is supported in the extended position against air loads encountered during landing or take-off mode of flight operation, by a pair of spaced apart, curved carrier tracks 24. The carrier tracks 24 are mounted on rollers 43, which have their rotational axes fixed to wing rib structure 32 as shown in the upper view of FIG. 5. These curved slat support tracks 24 are the main carrier tracks for the slat panels. The forward end of these tracks is pivotally connected at 44 to the slat panels; and the arcuate extension or retraction motion of the main carrier tracks 24 is about a theoretical center-of-rotation 46 as shown in FIG. 3. The carrier tracks 24, as shown in FIG. 1, are spaced apart at an optimum structural distance of approximately one-third of the length of a slat panel; however, the carrier tracks could be located at the ends of a slat panel. When a slat panel is in the fully retractd position, as shown in FIG. 2, the main carrier tracks 24 protrude aft through a small opening in the front wing spar 25 and this protrusion of the track has a fluid tight enclosure 26 because the interior of the wing is usually a fuel bay area.

In operation, for the initial slat panel extension movement from the retracted position, shown in FIG. 2, to the extended position, shown in FIG. 3, the rotary actuator 23 begins to rotate crank drive arm 35. It is evident from the kinematic arrangement of the linkage vector forces in FIG. 2, that the angular relationship between: the crank drive arm 35, the drive link 38 and the slat drive beam 40, is such that they would tend to lock up if they were to be operated without the controlled guidance of pivotal connection 39 and the engagement of roller follower 39A in the S-camtrack 33. The roller follower 39A, which is in axial alignment with pivotal connection 39, guides this connection along the arcuate S-camtrack 33 by producing a force vector component along the arcuate cam track 33 and this results in driving the slat drive beam 40 forward and out from the fixed wing leading edge. Therefore, the S-cam track in combination with the linkage mechanism, kinematically programs the slat panel 11D to move in a positively controlled manner throughout the three stages of slat operation as shown in FIGS. 2 to 4. Further, it will be noted that the angle-of-deflection of the slat chord plane (SCP), which is measured downwardly and forwardly from the wing chord plane (WCP), is optimized during the extension cycle for maximum aerodynamic performance of the slat/wing combination.

One of the advantages of combining the main slat carrier tracks with the integrated S-camtrack and linkage mechanism, is that this arrangement requires only a small opening through the fixed leading edge portion of the wing. Whereas, most of the known slat extension or retraction mechanisms have, in addition to the programming mechanism, an actuation system of either ballscrews or linear electric or hydraulic actuators which require an additional set of cutouts in the lower surface of the fixed portion of the wing for each slat panel. Referring to FIGS. 3 & 4, if the aft end of a linear actuator were secured to the front wing spar 25 and the forward end of said linear actuator connected to the slat panel 11D, it will be noted, that such an actuator would require a cutout in the lower surface of the fixed portion of the wing; and for the retracted position of the slat panel 11D, these cutouts would have to be closed off by some means in order to reduce aerodynamic drag at the higher cruise flight speed operation. These drag reduction means would generally comprise auxiliary doors and an actuating mechanism for opening the auxiliary doors to provide clearance for the slat panel actuator to get out through an opening in the lower fixed surface of the wing during extension of the slat panel 11D and then closing the auxiliary doors after the slat panel is retracted. However, the present invention does not require any auxiliary doors because the main carrier track 24 just goes out through one small opening in the fixed leading edge portion of the wing, which leaves a maximum amount of wing undersurface area, without having to cut through the wing skin and weaken it structurally; and when the slat panel 11D is in the retracted position, the lower surface of the slat panel covers the carrier track opening.

Another advantage of the integrated drive and programming unit, comprising the S-camtrack 33 and the simple linkage, is that identically sized integrated units can be located all along the outboard slat span, from the engine pylon 13 to the wing tip. However, because the slat and wing cross sections vary in thickness, due to wing taper, the crank drive arm 35 is repositioned at a different angular or clock position on the rotary actuator drive shaft 37, depending upon the specific wing location. Also, due to wing twist, the degree of drive arm clocking is not linear, but would be related to the amount of wing twist at each spanwise location. This combination of S-camtrack and simple linkage mechanism, kinematically programs the spanwise series of slat panels to move in a positively controlled manner throughout the three stages of slat operation; and optimizes the angle-of-deflection of the spanwise series of slat panels during the extension cycle to produce the maximum aerodynamic performance of the slat/wing combination.

Figure 5:
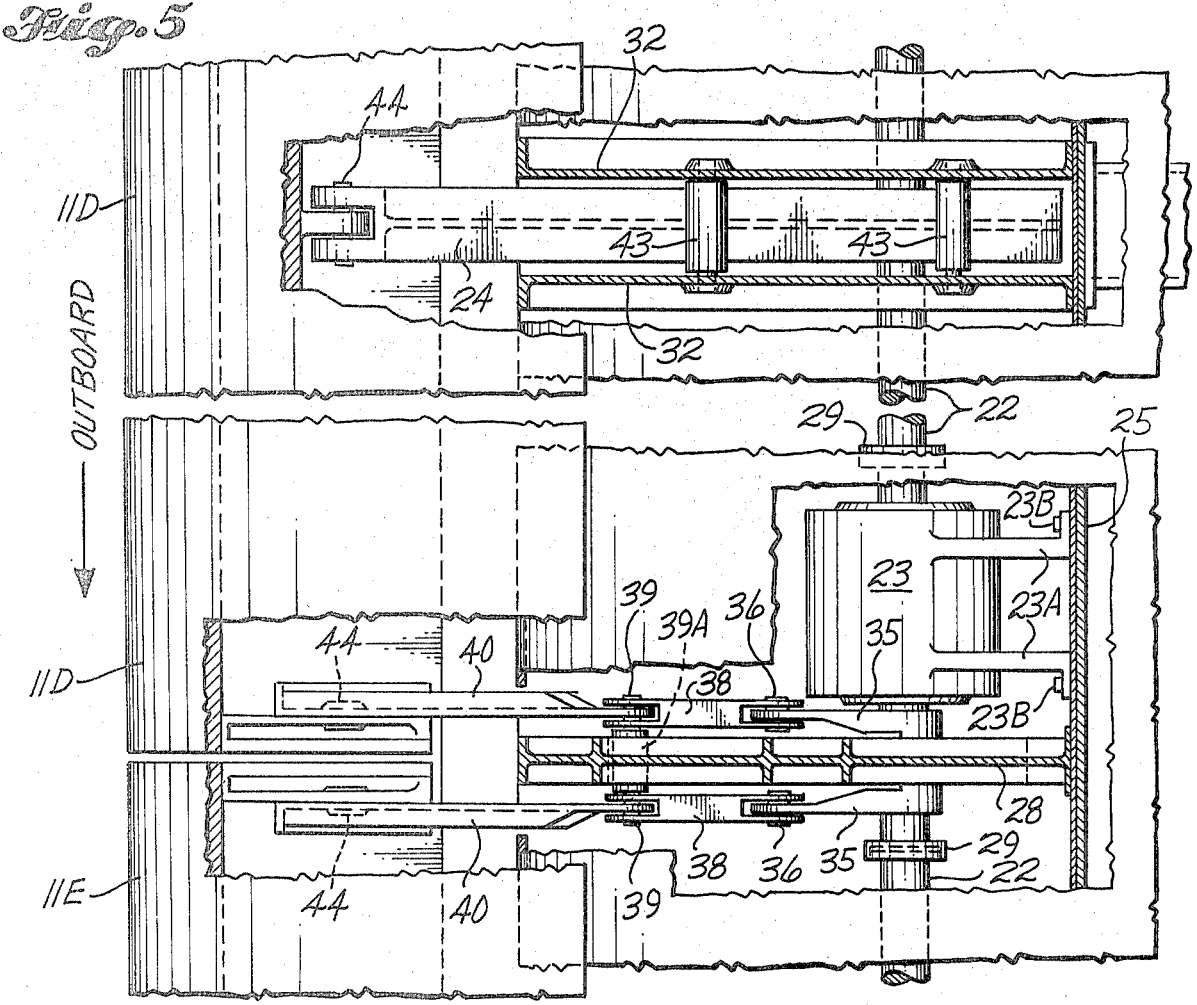
FIG. 5 is a plan view taken in the direction indicated by the line 5—5 of FIG. 3 and depicts a split-spanwise section of the wing. The lower split section of FIG. 5 depicts the S-camtrack and slat extension drive linkage; and the upper split section depicts, at an adjacent spanwise location, a carrier track and roller arrangement.

FIG. 5 is a plan view taken in the direction indicated by the line 5—5 of FIG. 3.

Figure 6:
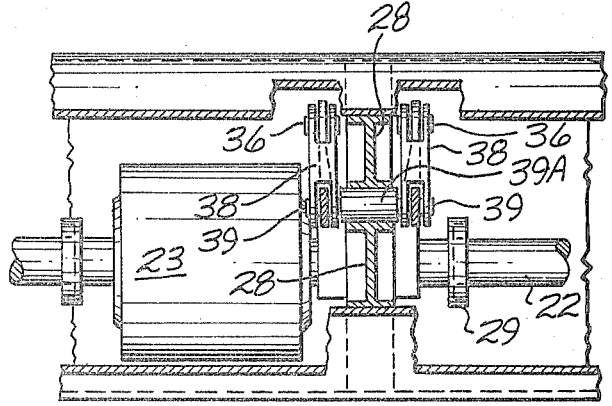
FIG. 6 is a sectional view taken along the line 6—6 of FIG. 3 in the direction indicated.

FIG. 6 is a sectional view taken in the direction indicated by the line 6—6 of FIG. 3.

Figure 7:
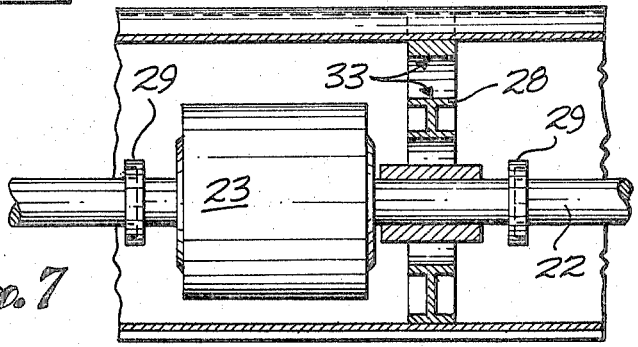
FIG. 7 is a sectional view taken along the line 7—7 of FIG. 4 in the direction indicated.

FIG. 7 is a sectional view taken in the direction indicated by the line 7—7 of FIG. 4.

Referring to FIGS. 5, 6 and 7, the actuator 23 is located adjacent to a wing leading edge rib 28 which is mounted forward from the front wing spar 25; and this wing rib 28 is centered between two spanwise adjacent slat panels, e.g. 11D and 11E. The housing for actuator 23 is mounted through flanges 23A and bolts 23B to the front wing spar 25. The actuator 23 has dual output drive arms 35 and provides the control connection between adjacent slat panels 11D and 11E for extension or retraction synchronization. The wing rib 28 is located in the center of the dual drive system and comprises an S-camtrack 33 which is cut clear through the rib in order that a cam follower roller 39A which rides in the S-camtrack 33, can extend through and be pivotally connected at its ends 39 to each drive link 38 of adjacent slat panels 11D and 11E. However, if the wing rib material remaing after S-camtrack slot is cutout, results in a critical structural support, then a separate S-camtrack member could be secured to each side of the rib in a back-to-back relationship and a cam follower roller could be cantilever mounted off a drive link positioned on each side of the wing rib; and the remainder of the drive mechanism could remain the same. The torque shafts 22 and the rotary actuator dual drive mechanisms, are the only things that coordinate the extension and the retraction sequence of slat panel operation. There is no separate set of programming tracks, as in most known slat systems, because the programming function is combined into the S-camtrack and drive linkage mechanism. Further, the axes of torque shafts 22 do not remain in alignment due to wing twist and flexture, so a universal coupling 29 is provided.

Referring to the extreme outboard slat panel 11E, shown in the plan view of FIG. 1, because the wing tapers both in plan form and in thickness toward the tip, the airfoil cross-sectional area forward of the front wing spar, for housing the integrated unit comprising the S-camtrack and drive linkage mechanism is substantially decreased toward the wing tip. However, for the complete outboard slat span, from the engine pylon 13 to the wing tip, the proportions of the S-camtrack and the drive linkage mechanism, remains the same. Therefore, due to limited cross-sectional area, it may not be possible to locate the integrated unit at the extreme wing tip end of the slat panel 11E and it will be necessary to position it at a slightly inboard location. In some wing configurations, it may even be necessary to provide a slight protrusion or bump in the lower wing surface in order to produce an area of sufficient size to completely enclose the integrated unit. Further, because different sized units are not used at each spanwise location or for each slat panel, it may be necessary to angularly orient or clock around an integrated unit at each of their locations in order to compensate for wing warp or twist. By clocking the drive arm 35 around on drive shaft 37, at the various spanwise locations of the S-camtrack and linkage mechanisms, the entire wing leading edge slat span is capable of moving in unison into the desired angle-of-deflection position relative to the fixed wing chord plane.

While the invention has been disclosed with reference to a preferred embodiment, it is to be understood that those modifications and changes which become obvious to a person skilled in the art to which this invention pertains, as a result of the teachings hereof, are considered to be encompassed by the following claims.

I claim:

1. A mechanism for extending and positioning a pair of spanwise adjacent high-lift devices relative to an airfoil, comprising: a pair of carrier tracks extending chordwise of said airfoil for supporting each of said high-lift devices; said carrier tracks being supportably guided toward one end by rollers mounted to said airfoil and pivotally connected at the other end to said high-lift devices for support thereof; a structural rib member extending chordwise of said airfoil and being positioned between said pair of spanwise adjacent high-lift devices; a pair of chordwise integrated linkage mechanisms spaced apart spanwise and arranged on either side of said rib member for operative connection to each of said high-lift devices; a camtrack cut transversely through said rib member and formed structurally integral therewith; a roller follower having its rotational axis aligned transversely to said chordwise extending rib member and extending through said camtrack for pivotal connection at its ends to each of said chordwise integrated linkage mechanisms, thereby providing a direct interconnection between said adjacent high-lift devices for synchronization of extension actuation with position programming control of angle-of-deflection of said high-lift device relative to the airfoil.

2. The mechanism for extending and positioning a pair of spanwise adjacent high-lift devices relative to an airfoil as set forth in claim 1, wherein: said camtrack and said pair of chordwise integrated linkage mechanisms, in combination, extending said pair of high lift devices, from a retracted stowed position whereat they form the leading edge nose structure of said airfoil, to a first forward and downward extended operation position whereat a continuous upper surface contour is formed between said high-lift devices and the relatively fixed leading edge portion of said airfoil, and to a second further extended operating position whereat an aerodynamic slot is formed between said high-lift devices and the relatively fixed leading edge portion of said airfoil.

3. A mechanism for extending and positioning a pair of spanwise adjacent high-lift devices relative to an airfoil, comprising: a pair of carrier tracks extending chordwise in said airfoil and being pivotally connected at their one end to said high-lift devices; cylindrical rollers axially mounted to said airfoil for rolling support of the other end portion of said carrier tracks; a structural rib member extending chordwise of said airfoil and being located between said pair of spanwise adjacent high-lift devices; a camtrack cut transversely through said rib member and formed structurally integral therewith; a pair of chordwise integrated linkage mechanisms spaced apart spanwise and arranged on each side of said rib member for operative connection to each of said high-lift devices; each of said chordwise integrated linkage mechanisms comprising, a drive arm mounted to said airfoil for rotation in a chordwise plane, a drive link pivotally connected at one end to the swinging end of said drive arm, and a drive beam extending chordwise and being pivotally connected at one end to the other end of said drive link and being fixedly secured at its other end to one of said high-lift devices; a roller cam follower having its rotational axis aligned transversely to said chordwise extending rib member and extending through said camtrack for connection at its ends to the pivotal connection between said drive beam and said drive link of each of said chordwise integrated linkage mechanisms, for producing a force vector component to each of said linkage mechanisms along the arcuate track of said camtrack, and thereby providing a direct interconnection between said adjacent high-lift devices for synchronization of extension actuation with position programming control of angle-of-deflection of said high-lift devices relative to said airfoil.

4. The mechanism for extending and positioning a pair of spanwise adjacent high-lift devices relative to an airfoil as set forth in claim 3, wherein: said camtrack and said pair of chordwise integrated linkage mechanisms, in combination, extending said pair of highlift devices, from a retracted stowed position whereat said pair of high-lift devices form the leading edge nose structure of said airfoil, to a first forward and downward extended operating position whereat a continuous upper surface contour is formed between said high-lift devices and the relatively fixed leading edge portion of said airfoil, and to a second further extended operating position whereat an aerodynamic slot is formed between said high-lift devices and the relatively fixed leading edge portion of said airfoil.

5. A mechanism for extending and positioning a pair of spanwise adjacent high-lift devices relative to the leading edge of an airfoil, comprising: a pair of carrier tracks extending chordwise fore and aft in said airfoil and being pivotally connected at their fore end to said high-lift devices; cylindrical rollers axially mounted to said airfoil for rolling support of the aft portion of said carrier tracks; a structural rib member extending chordwise of said airfoil and being positioned between said pair of spanwise adjacent high-lift devices; a camtrack cut transversely through said rib member and formed structurally integral therewith; a pair of chordwise integrated linkage mechanisms spaced apart spanwise and arranged on either side of said rib member for operative connection to each of said high-lift devices; each of said chordwise integrated linkage mechanisms comprising, a drive arm mounted to said airfoil for rotation in a chordwise plane, a drive link pivotally connected at one end to the swinging end of said drive arm, and a drive beam extending fore and aft chordwise and being pivotally connected at its aft end to the other end of said drive link and being fixedly secured at its fore end to one of said high-lift devices; a roller cam follower having its rotational axis aligned transversely to said chordwise extending rib member and extending through said camtrack for connection at its ends to the pivotal connection between said drive beam and said drive link of each of said chordwise integrated linkage mechanisms, for producing a force vector component to each of said linkage mechanisms along an arcuate track of said camtrack, and thereby providing a direct interconnection between said adjacent high-lift devices for synchronization of extension actuation with position programming control of angle-of-deflection of said high-lift devices relative to the leading edge of said airfoil.

6. The mechanism for extending and positioning a pair of spanwise adjacent high-lift devices relative to an airfoil as set forth in claim 3, wherein: said camtrack and said pair of chordwise integrated linkage mechanisms, in combination, extending said pair of high lift devices, from a retracted stowed position whereat said pair of high-lift devices form the leading edge nose structure of said airfoil, to a first forward and downward extended operating position whereat a continuous upper surface contour is formed between said high-lift devices and the relatively fixed leading edge portion of said airfoil, and to a second further extended operating position whereat an aerodynamic slot is formed between said high-lift devices and the relatively fixed leading edge portion of said airfoil.

7. A mechanism for extending and positioning a high-lift device relative to an airfoil, comprising: a carrier track extending chordwise in said airfoil and being pivotally connected at one end to said high-lift device; means mounted to said airfoil for supportably guiding the other end portion of said carrier track for chordwise extension movement of said high-lift device relative to said airfoil; a camtrack spaced spanwise from said carrier track and fixedly mounted chordwise in said airfoil; a rotary actuator mounted in said airfoil; a linkage mechanism being in a folded arrangement during a fully retracted position of said high-lift device relative to said airfoil and interconnecting said high-lift device with said camtrack and said rotary actuator; said rotary actuator in combination with said linkage mechanism, said camtrack and said carrier track, effecting a simultaneously combined unfolding linkage extension movement of said high-life device on said carrier track from said airfoil, and a camtrack guided angle-of-incidence programming of said high-lift device relative to said airfoil; and said camtrack producing a guided force vector component to said linkage mechanism during unfolding linkage extension movement of said high-lift device, for enabling said linkage mechanism to freely operate a complete extension cycle of said high-lift device without locking up.

8. The mechanism for extending and positioning a high-lift device relative to an airfoil as set forth in claim 7, wherein: said rotary actuator, said camtrack and said linkage mechanism, in combination, extending said high-lift device, from a retracted stowed position whereat said high-lift device forms the leading edge nose structure of said airfoil, to a first forward and downward extended operating position whereat a continuous upper surface contour is formed between said high-lift device and the relatively fixed leading edge portion of said airfoil, and to a second further extended operating position whereat an aerodynamic slot is formed between said high-lift device and the relatively fixed leading edge portion of said airfoil.

9. A leading edge slat extension and position programming control mechanism for an airfoil, comprising:

a slat panel forming a leading edge nose structure of said airfoil and being extensible from a relatively fixed portion of said airfoil; a carrier track extending chordwise fore and aft of said airfoil, and being pivotally connected at its fore end to said slat panel; cylindrical rollers being axially mounted to said relatively fixed portion of said airfoil, for rolling contact support of the aft portion of said carrier track; a rib member extending chordwise of said airfoil and being structurally integral with said relatively fixed portion of said airfoil; a camtrack formed structurally integral with said rib member; a chordwise integrated linkage mechanism being positioned adjacent to said rib member and comprising, a drive arm mounted to the relatively fixed portion of said airfoil for rotation in a chordwise plane, a drive link pivotally connected at one end to the swinging end of said drive arm, and a drive beam extending fore and aft chordwise and being pivotally connected at its aft end to the other end of said drive link and being fixedly secured at its fore end to said slat panel; a cam follower engaged in said camtrack and connected to the pivotal connection between said drive beam and said drive link for producing a force vector component to said linkage mechanism along the arcuate track of said camtrack; a rotary actuator mounted in said airfoil; said chordwise integrated linkage mechanism being in a folded arrangement during a fully retracted position of said slat panel relative to said fixed portion of said airfoil, and interconnecting said slat panel with said camtrack and said rotary actuator; said rotary actuator in combination with said linkage mechanism, said camtrack and said carrier track, effecting a simultaneously combined unfolding linkage extension movement of said slat panel on said carrier track from said fixed portion of said airfoil, and a camtrack guided angle-of-incidence programming of said slat panel relative to said fixed portion of said airfoil; and said camtrack providing a guided force vector component to said linkage mechanism during unfolding linkage extension movement of said slat panel, for enabling said linkage mechanism to freely operate the complete extension cycle of said slat panel without locking up.

10. A leading edge slat extension and position programming control mechanism for an airfoil as set forth in claim 9, wherein: said rotary actuator, said camtrack and said linkage mechanism, in combination, extending said slat panel, from a retracted stowed position whereat said slat panel forms the leading edge nose structure of said airfoil, to a first forward and downward extended operating position whereat a continuous upper surface contour is formed between said slat panel and the relatively fixed leading edge portion of said airfoil, and to a second further extended operating position whereat an aerodynamic slot is formed between said slat panel and the relatively fixed leading edge portion of said airfoil.

* * * * *